United States Patent
Jones et al.

(10) Patent No.: US 7,873,801 B2
(45) Date of Patent: Jan. 18, 2011

(54) PARTITIONABLE ACCOUNTING OF MEMORY UTILIZATION

(75) Inventors: Blake A. Jones, Oakland, CA (US); George R. Cameron, Santa Cruz, CA (US); Eric E. Lowe, Pflugerville, TX (US)

(73) Assignee: Oracle America, Inc., Redwood City, CA (US)

( * ) Notice: Subject to any disclaimer, the term of this patent is extended or adjusted under 35 U.S.C. 154(b) by 254 days.

(21) Appl. No.: 11/670,412

(22) Filed: Feb. 1, 2007

(65) Prior Publication Data
US 2008/0189502 A1 Aug. 7, 2008

(51) Int. Cl.
*G06F 12/00* (2006.01)
(52) U.S. Cl. .............. 711/158; 711/151; 711/163; 711/170; 711/E12.001
(58) Field of Classification Search .......... 711/154–173
See application file for complete search history.

(56) References Cited

U.S. PATENT DOCUMENTS

| | | | |
|---|---|---|---|
| 4,422,145 A * | 12/1983 | Sacco et al. ............... 711/160 |
| 5,390,334 A * | 2/1995 | Harrison ................... 713/324 |
| 5,619,696 A * | 4/1997 | Nakagawa ................ 718/100 |
| 5,860,131 A * | 1/1999 | Daub ........................ 711/170 |
| 6,058,460 A * | 5/2000 | Nakhimovsky ........... 711/153 |
| 6,347,364 B1 * | 2/2002 | Liedtke ..................... 711/163 |
| 6,360,220 B1 * | 3/2002 | Forin .......................... 707/8 |
| 2003/0097536 A1 * | 5/2003 | Atherton et al. .......... 711/170 |
| 2004/0064664 A1 * | 4/2004 | Gil ............................ 711/170 |
| 2005/0114621 A1 * | 5/2005 | Lahiri et al. .............. 711/170 |

* cited by examiner

*Primary Examiner*—Reginald G Bragdon
*Assistant Examiner*—Daniel J Bernard
(74) *Attorney, Agent, or Firm*—Osha • Liang LLP (57) ABSTRACT

Managing physical memory for one or more processes with both a minimum and a maximum amount of physical memory. Memory sets are created, each specifying a number of credits. The total number of credits specified by all memory sets are equal to the total number of pages in physical memory. One or more processes are bound to a memory set. All of the processes bound to a memory set are collectively referred to as the workload of the memory set. Each physical page is accounted for to ensure that each workload can utilize at least the number of physical pages equaling the number of credits in its memory set. Additionally, a workload is permitted to use physical pages that are being explicitly shared by workloads of other memory sets. Accordingly, a workload with both a minimum and a maximum amount of physical memory is specified by its memory set.

20 Claims, 4 Drawing Sheets

PARTITIONABLE ACCOUNTING OF MEMORY UTILIZATION

FIELD OF INVENTION

The present invention relates generally to operating systems and, in particular but not exclusively, to memory management and quality of service.

BACKGROUND OF THE INVENTION

Conventional memory management systems of operating systems treat physical memory as a cache that is to be shared indiscriminately by all processes. Hence, conventional memory management systems do not provide facilities for guaranteeing or reserving a percentage of physical memory to a particular process or a group of processes. Accordingly, conventional memory management systems allow a single process to utilize an arbitrary amount of physical memory at the expense of other processes.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Through the specification and claims, the following terms take meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on," "based, at least in part, on," or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is related to a method and apparatus for managing physical memory to guarantee one or more processes with both a minimum and a maximum amount of physical memory. One or more memory sets are maintained, each specifying a number of credits. The total number of credits specified by all memory sets must be equal to the total number of physical pages. One or more processes are bound to a memory set. All of the processes bound to a memory set are collectively referred to as the workload of the memory set. The use of each physical page is accounted for to ensure that each workload can utilize the number of physical pages equaling the number of credits in its memory set. Accordingly, the present invention guarantees a workload with a minimum amount of physical memory specified by its memory set. This minimum amount is also generally the maximum amount of physical memory available to the workload. The workload can only exceed the maximum to the extent that it is using an explicitly shared memory region which has been charged to another memory set.

Figure 1:
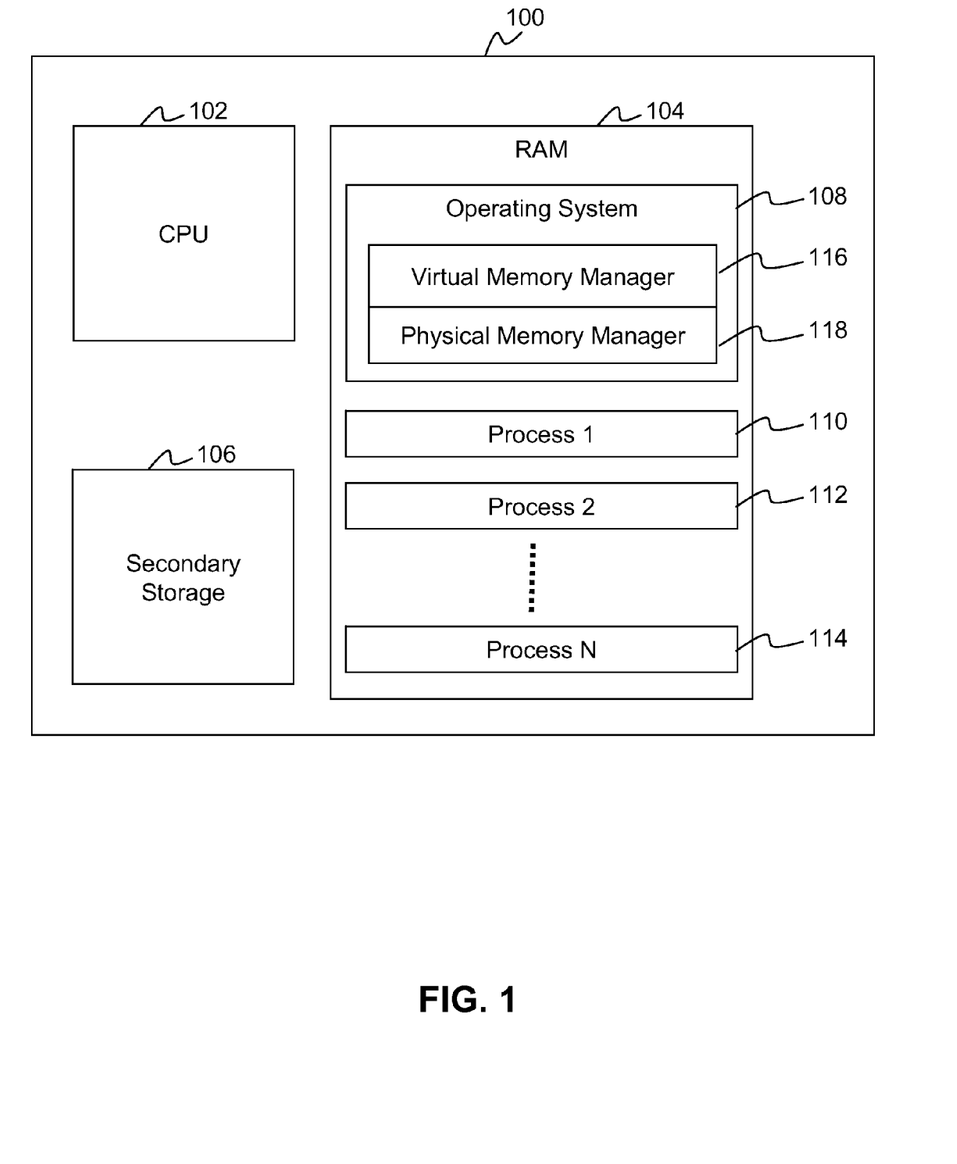
FIG. 1 depicts a block diagram of an embodiment of a device in accordance with the present invention.

FIG. 1 depicts a block diagram of a device 100 in accordance with the present invention. Device 100 includes central processing unit (CPU) 102, physical memory 104, and secondary storage 106. Physical memory 104 is preferably random access memory (RAM). Secondary storage 106 can be, for example, a hard disk drive. As will be appreciated by persons skilled in the art, various other components that are typically included in a computer-based system can be included in device 100. For example, device 100 can be implemented as a computer system 400 depicted in FIG. 4, which is described in greater detail below.

CPU 102 executes code and manipulates data stored in physical memory 104. Physical memory 104 can include code and data for operating system 108 and one or more processes 110-114. Operating system 108 includes a virtual memory manager 116 for providing virtual memory support to processes, such as processes 110-114. Techniques for providing virtual memory support are well known to persons skilled in the art. Operating system 108 also includes physical memory manager 118 which interacts with virtual memory manager 116 to manage physical memory 104 in accordance with the present invention.

In providing virtual memory support, virtual memory manager 116 divides the addressable memory of a process into a collection of virtual pages. A virtual page refers to a range of contiguously addressable memory in the address space of a process. Additionally, virtual memory manager 116 divides physical memory 104 into a collection of physical pages. A physical page represents a range of contiguously addressable physical memory that can be associated with one or more virtual pages. Hence, physical pages and virtual pages are preferably of a fixed size and are typically 4K (4 Kilobytes) or 8K (8 Kilobytes) in size.

Virtual memory manager 116 is responsible for ensuring that virtual pages of a process are associated with physical pages in physical memory 104 as needed to allow CPU 102 to execute the process. When a virtual page is associated With a physical page in physical memory, the virtual page is referred to as being in core. Additionally, when a virtual page is in core and must remain in core, the physical page is referred to as being referenced. A physical page is referenced, for example, when the contents of the page are being transitioned between physical memory 104 and secondary storage 106, when information mapping the physical page to a virtual page is made available to CPU 102, when a process requests that the page be kept in core, or when an I/O transfer is being performed on the page.

A physical page can be associated with and referenced by virtual pages of multiple processes to allow the multiple processes to address common content in physical memory. This approach allows static content, such as shared library routines, program text, or read-only data, to be stored only once in physical memory while being addressable by multiple processes. Additionally, this approach allows multiple processes to address and modify common content in physical memory. When a virtual page is associated with a physical page to address common content that is accessible by other processes, the physical page is referred to as being explicitly shared. A physical page becomes explicitly shared when a virtual page of a process referencing the physical page becomes associated with a shared memory object and becomes unshared when it becomes disassociated with its shared memory object.

Accordingly, virtual memory manager 116 is responsible for managing the various ways that a physical page can be used with virtual pages. Physical memory manager 118 monitors the activities of virtual memory manager 116 and tracks how each physical page is being utilized to ensure that workloads can use their guaranteed amount of physical memory in accordance with the present invention.

Figure 2:
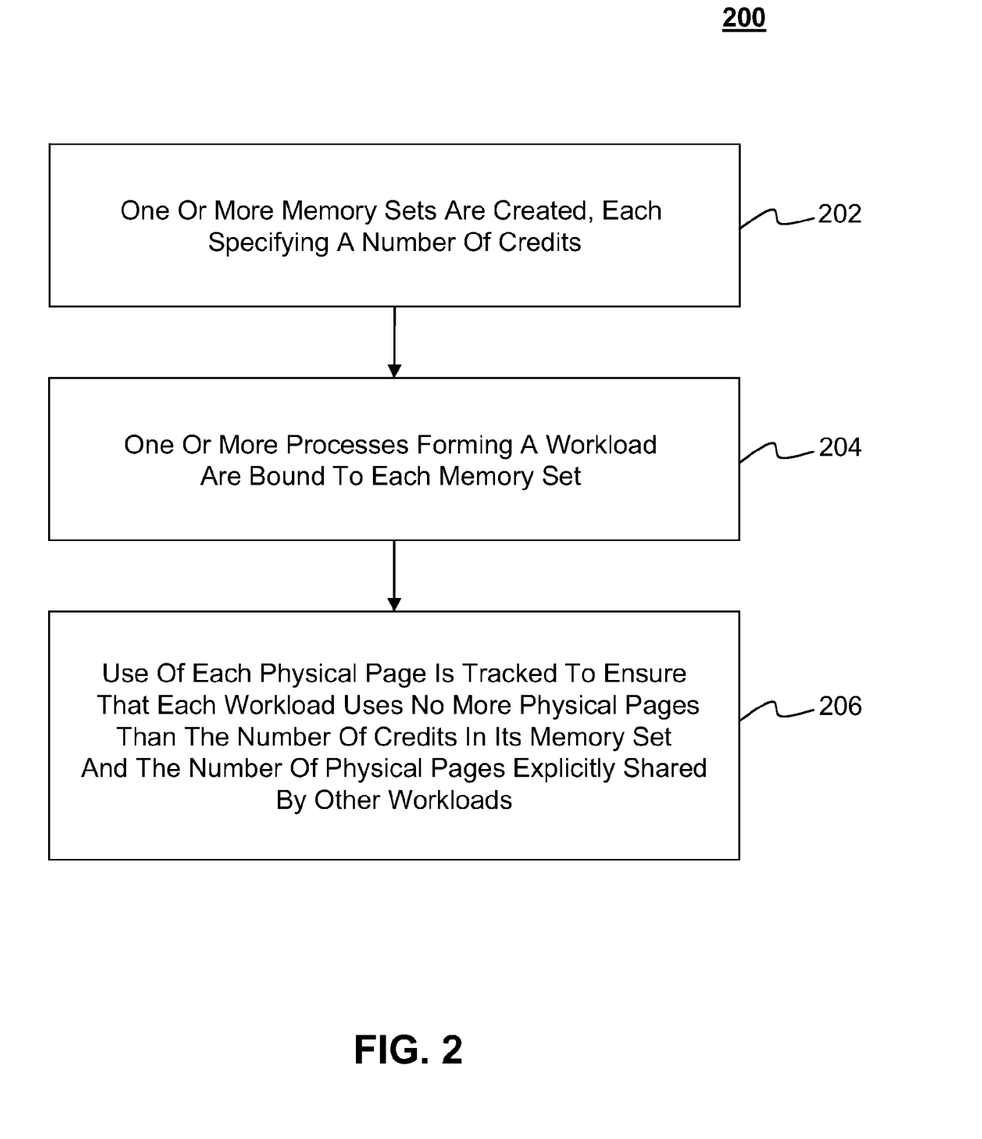
FIG. 2 depicts a flow chart illustrating a method for managing physical memory in accordance with the present invention.

Referring to FIG. 2, a flow chart is shown illustrating a method 200 for managing physical memory in accordance with the present invention. Method 200 can be implemented, for example, by physical memory manager 118.

In step 202, one or more memory sets are created. A memory set specifies a number of credits. Additionally, a memory set represents a logical set of physical pages. When a physical page is included in a memory set, the memory set is charged a credit. When a physical page is removed from the memory set, it is refunded a credit. Once a particular credit has been charged to a memory set, the memory set cannot reuse the credit until it has been refunded. Accordingly, the maximum number of physical pages that can be included in a memory set is equal to the number of credits specified for the memory set.

Furthermore, to ensure that every memory set can include its maximum number of physical pages, the sum of the number of credits specified for all memory sets must be equal to the total number of physical pages.

In step 204, one or more processes are bound to a memory set. When a child process is created, it is automatically bound to the parent process' memory set. All processes bound to a memory set are collectively referred to as the workload of the memory set.

Creation of memory sets and the binding of processes to memory sets can be specified by a user through the use of a command line interface (CLI), through a configuration file, a graphical user interface (GUI), or through other mechanisms for specifying commands to an operating system.

In step 206, the use of each physical page is accounted for to ensure that each workload does not utilize more physical pages than the number of credits in its memory set and the number of physical pages that are part of explicitly shared memory regions already charged to other memory sets.

Before a workload is permitted to utilize a physical page that is not being explicitly shared, the workload must first charge the physical page to its memory set. Accordingly, when multiple workloads are utilizing a physical page that is not being explicitly shared to access, for example, static content such as shared library routines, program text, or read-only data, each workload's memory set is charged for utilizing the physical page.

Once a physical page is charged to a workload's memory set, the workload may choose to explicitly share the physical page. When a workload explicitly shares a physical page, the physical page remains charged to the workload's memory set even though other workloads may utilize the explicitly shared physical page without charging the physical page to their own memory sets. Accordingly, all utilized physical pages, whether explicitly shared or not, are charged to at least one memory set.

Since every utilized physical page is charged and since the total number of credits of all memory sets does not exceed the total number of physical pages, each workload is guaranteed that there will be a sufficient number of free physical pages that can be charged to its own memory set.

Accordingly, the present invention tracks how each physical page is being utilized to properly charge and refund each workload's memory set. By properly accounting the use of each physical page, the present invention guarantees each workload both a minimum and a maximum amount of physical memory.

Tracking the amount of physical memory utilized by a workload requires tracking which physical pages are being utilized by the individual processes in the workload. A process utilizes a physical page when it associates its virtual page with the physical page. Furthermore, two or more processes of the same workload can utilize the same page, and even processes of multiple workloads can utilize the same physical page. When a process releases a reference, the process' workload may stay charged for the usage of that page because the physical page is being utilized by another process, the physical page is associated with an explicitly shared memory object, or the virtual memory manager chooses to continue to associate the virtual page with the physical page on the chance that it may be referenced again later by another process.

Accordingly, credits cannot simply be charged and refunded to a memory set as each process in a workload references or releases a reference to a physical page. For example, when a physical page is charged to a memory set because a process in its workload is referencing the physical page, the memory set should not be charged again when another process in its workload references the same physical page since they are part of the same workload. In another example, when a process releases a reference to a physical page and there are other references to the physical page, it is sometimes difficult to distinguish whether the other references are being made by other processes in its own workload or by other processes in other workloads. Hence, if a process releases a reference to a physical page and there are still other references remaining for the physical page, the physical page must be treated as if it is still being utilized by the process' workload since there is a chance that the remaining references were made by other processes in its workload. Furthermore, if a process releases a physical page and there are no other references to the physical page but the virtual memory manager does not free the physical page, the physical page should be treated as being utilized by the process' workload since it is not technically free, and as such, it must remain charged to some memory set.

To facilitate how a memory set should be charged and refunded when each process acquires and releases a reference to a physical page, state information is maintained for each physical page. State information includes a memory set list and a billing state. A physical page's set list is used to keep track of which memory sets are being currently charged for the physical page. A physical page's billing state indicates how the physical page is currently being charged and indicates how the physical page should be charged and refunded to memory sets when a process acquires or releases a reference to the physical page. The four possible billing states are referred to as: FREE, FULL_PRICE (FP), CREATOR_CHARGED (CC), and INACTIVE.

When a physical page has a billing state of FREE, the physical page is not being charged to any memory set and is not being referenced by any process. Accordingly, a physical page with a billing state of FREE has an empty set list. When a process references a physical page with a billing state of FREE, the process' memory set should be charged since it is the first process in the memory set's workload to reference the physical page, and the process' memory set should be added to the physical page's set list.

When a physical page has a billing state of FP, the physical page is being referenced by one or more processes and being charged to one or more memory sets. Accordingly, a physical page with a billing state of FP has a set list containing a list of memory sets that are being charged for the physical page. When a process references a physical page with a billing state of FP, the physical page's set list is inspected to determine if the process' memory set is already being charged. If the process' memory set is already being charged, the memory set is not charged again since the process represents an additional process in the memory set's workload which is utilizing the physical page. If the process' memory set is not already being charged, the memory set is charged and the set list of the physical page is updated to include the new memory set since the process represents the first process in the memory set's workload to utilize the physical page.

When a process releases a reference to a physical page having a billing state of FP, memory sets are refunded based on whether the process released the last reference to the physical page. If the process releases a reference to the physical page and there are still other references to the physical page remaining, none of the memory sets being charged to the physical page are refunded. If the process releases the last reference to the physical page and the virtual memory manager does not free the physical page, then all of the memory sets other than the memory set associated with the process are refunded, and the refunded memory sets are removed from the physical page's set list. The memory set associated with the process remains charged for the physical page since the virtual memory manager has not yet freed the page. If the virtual memory manager frees a physical page with a billing state of FP, all of the memory sets in the physical page's set list are refunded and the set list of the physical page is emptied.

When a physical page has a billing state of CC, the physical page is being explicitly shared, referenced by one or more processes, and is being charged to the memory set whose process chose to share the physical page by associating the physical page with a shared memory object. Accordingly, the physical page's set list contains only the one memory set being charged. When a process in a different memory set references a physical page having a billing state of CC, its memory set is not charged. Additionally, when a process in a different memory set releases a reference to the physical page, no memory sets are refunded.

When a physical page has a billing state of INACTIVE, the physical page is not being referenced by any processes but is being charged to the memory set whose process last referenced the physical page. Accordingly, the physical page's set list contains only the one memory set being charged. When a process references the physical page, the physical page's set list is inspected to determine if the process memory set is currently the memory set being charged for the physical page. If the process's memory set is already being charged, no additional charges are required. If the process' memory set is not already being charged, the memory set whose process last referenced the physical page is refunded and the new process' memory set is charged.

Hence, depending on the billing state of a physical page, a process's memory set may or may not be charged when the process references the physical page. To ensure that a reference by a process will not cause the process' memory set to exceed the number of credits it is allotted, a process must first reserve a credit before attempting to reference a physical page. When a credit is reserved by a process, it cannot be charged to the memory set by any other process. If all of the credits in the process' memory set have been charged or if all of the unused credits in the process' memory set are reserved by other processes, the process must wait until it can reserve a credit. Once a process has reserved a credit, it can reference a physical page. As noted above, the reference may or may not cause the credit to be charged. If the physical page is referenced by the process and a credit has not been charged, the credit is returned to the process' memory set and is no longer reserved by the process.

Figure 3:
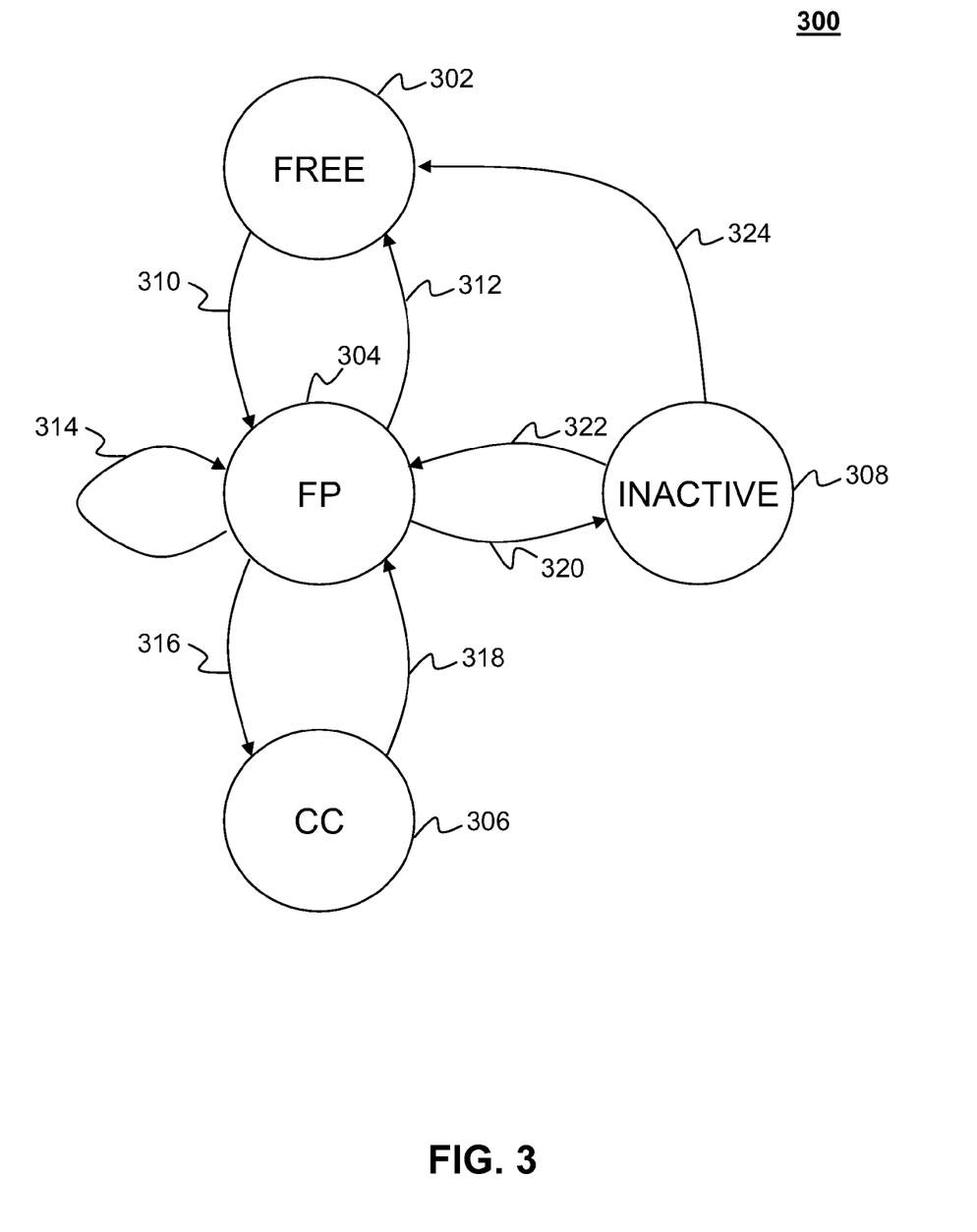
FIG. 3 depicts a state transition diagram illustrating how billing states for accounting the use of a physical page are transitioned from one state to another.

Furthermore, as processes reference and release physical pages, share and unshare physical pages, and the virtual memory manager frees physical pages, the billing state of the physical page may need to be updated. FIG. 3 depicts a state transition diagram 300 illustrating how the billing state of the physical pages transitions from one state to another. Transition diagram 300 includes four states 302, 304, 306, and 308 reflecting each of the billing states FREE, FP, CC, and INACTIVE, respectively. Transition diagram 300 includes paths 310-324 which indicate the various activities that cause a physical page to transition into another billing state.

A physical page with a billing state of FREE transitions along path 310 to billing state FP when a process references the physical page. A physical page with a billing state FP remains in billing state FP along path 314 when another process whose memory set is not being charged for the physical page references the physical page. A physical page with a billing state of FP transitions along path 320 to billing state INACTIVE when the last reference to the physical page is released and the page is not freed. A physical page with a billing state of INACTIVE transitions along path 322 to billing state FP when a process references the physical page. A physical page with a billing state of FP transitions along path 316 to billing state CC when the physical page is explicitly shared by associating the page with an explicitly shared memory object. A physical page with a billing state of CC transitions along path 318 to billing state FP when the physical page is unshared by disassociating the page from its shared memory object. A physical page with a billing state of FP transitions along path 312 to billing state FREE when the physical page is freed. A physical page with a billing state of INACTIVE transitions along path 324 to billing state FREE when the physical page is freed. Whenever a physical page is freed, the memory sets being charged for the physical page are refunded.

Figure 4:
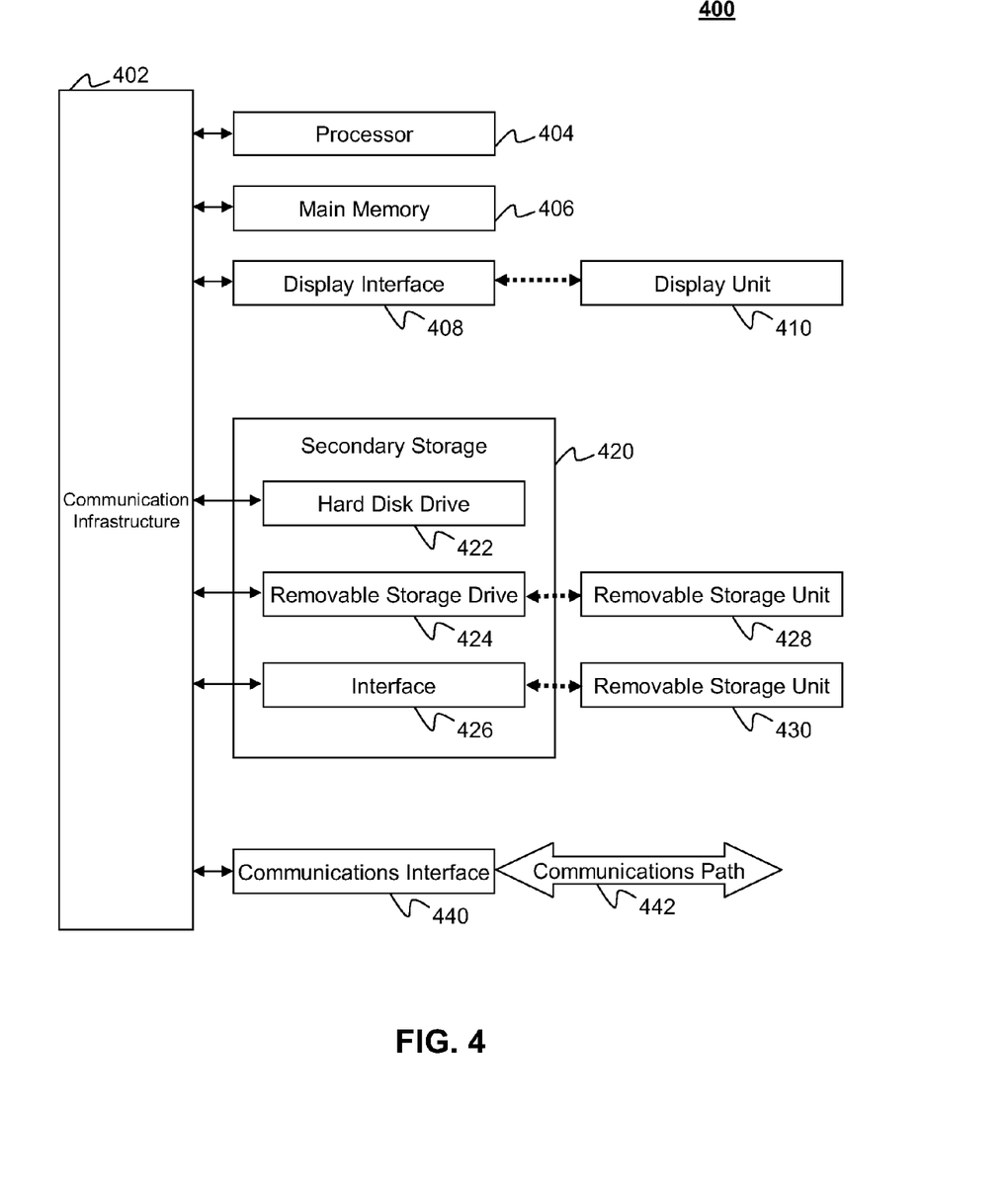
FIG. 4 depicts an exemplary computer system in accordance with the present invention.

The following description of a general purpose computer system is provided for the sake of completeness. Embodiments of the present invention can be implemented in hardware, or as a combination of software and hardware. Consequently, the invention can be implemented in the environment of a computer system or other processing systems. An example of such a computer system 400 is shown in FIG. 4. In the present invention, all of the processing blocks or steps of FIG. 2, for example, can execute on one or more distinct computer systems 400, to implement the various methods of the present invention. Computer system 400 includes one or more processors, such as processor 404. Processor 404 can be a special purpose or a general purpose digital signal processor. Processor 404 is connected to communication infrastructure 402 (for example, a bus or network).

Computer system 400 can include display interface 408 that forwards graphics, text, and other data from communication infrastructure 402 (or from a frame buffer not shown) for display on display unit 410. Display unit 410 can be, for example, a liquid crystal display (LCD), a plasma display panel (PDP), touch-screen display, and the like.

Computer system 400 also includes main physical memory 466, preferably RAM, and can also include secondary storage 420. Secondary storage 420 can include, for example, hard disk drive 422 and/or removable storage drive 424, representing a floppy disk drive, a magnetic tape drive, an optical disk drive, a flash memory card reader or the like. Removable storage unit 428 represents a floppy disk, magnetic tape, optical disk, flash memory card, or the like, which is read by and written to by removable storage drive 424. As will be appreciated, removable storage unit 428 includes a computer usable storage medium having stored therein data and/or computer software.

In alternative implementations, secondary storage 420 can include other similar means for allowing computer programs or other instructions to be loaded into computer system 400. Such means can include, for example, removable storage unit 430 and interface 426. Examples of such means can include a program cartridge and cartridge interface (such as that found in video game devices), a removable memory chip (such as an EPROM, or PROM) and associated socket, and other removable storage units 430 and interfaces 426 which allow software and data to be transferred from removable storage unit 430 to computer system 400.

Computer system 400 can also include communications interface 440. Communications interface 440 allows software and data to be transferred between computer system 400 and external devices. Examples of communications interface 440 can include a modem, a network interface (such as an Ethernet card), a wireless transceiver, a communications port, a PCMCIA slot and card, etc. Software and data transferred via communications interface 440 are in the form of signals, which can be electronic, electromagnetic, optical, or other signals capable of being received by communications interface 440. These signals can be provided to communications interface 440 via communications path 442. Communications path 442 carries signals and can be implemented using wire or cable, fiber optics, a phone line, a cellular phone link, an RF link and other communications channels.

As used herein, the terms "computer program medium," "computer usable medium," and "processor-readable medium" are used to refer generally to media such as removable storage units 428 and 430, a hard disk installed in hard disk drive 422, and the like. These computer program products are means for providing software to computer system 400.

Computer programs (also referred to as computer control logic and processor-executable code) are stored in main physical memory 406 and/or secondary storage 420. Computer programs scan also be received via communications interface 440. Such computer programs, when executed, enable computer system 400 to implement memory manager 110 and other aspects of the present invention as discussed herein. In particular, the computer programs, when executed, enable processor 400 to implement the processes of the present invention, such as the methods described with reference to FIG. 2, for example. Accordingly, such computer programs represent controllers of computer system 400. Where the invention is implemented using software, the software can be stored in a computer program product and loaded into computer system 400 using removable storage drive 424, interface 426, or communications interface 440.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method of managing physical memory comprising:
creating a plurality of memory sets, wherein each of the plurality of memory sets is associated with a number of available credits;
binding a first workload to a first memory set of the plurality of memory sets, wherein the first workload is formed by a first process, wherein the number of available credits associated with the first memory set identifies a first number of physical pages available to be referenced by the first process;
binding a second workload to a second memory set of the plurality of memory sets, wherein the second workload is formed by a second process, wherein the number of available credits associated with the second workload identifies a second number of physical pages available to be referenced by the second process, wherein the first number of physical pages and the second number of physical pages are selected from a plurality of physical pages within the physical memory;
receiving, from the first process, a first request to reference a physical page of the plurality of physical pages, wherein the physical page has a billing state of free;
denying the first request in response to determining that the number of available credits associated with the first workload is less than a number of available credits necessary for the first process to reference the physical page;
receiving, from the second process, a second request to reference the physical page;
referencing, by the second process, the physical page in response to determining that the number of available credits associated with the second workload is not less than a number of available credits necessary for the second process to reference the physical page; and
updating the number of available credits associated with the second workload to reflect the reference of the physical page by the second process.

2. The method of claim 1, wherein a sum of the number of available credits and a number of charged credits specified for all memory sets is equal to a total number of physical pages in the physical memory.

3. The method of claim 1, wherein updating a number of available credits comprises:
reserving the available credit from the second memory set to obtain a reserved credit; and
returning the reserved credit to the second memory set if the reserved credit is not charged to the second memory set.

4. The method of claim 1, further comprising:
   detecting the first process sharing the physical page; and
   ensuring that the second memory set is the only memory set charged an available credit for the physical page while the physical page is explicitly shared.

5. The method of claim 1, wherein updating the number of available credits comprises:
   charging an available credit to the second memory set, to obtain a charged credit, if the process is an initial process in the second workload to reference the physical page.

6. The method of claim 5, further comprising:
   detecting the second process releasing a last reference to the physical page; and
   refunding the charged credit to the second memory set.

7. The method of claim 5, further comprising:
   detecting the physical page being freed; and
   refunding the charged credit to the second memory set.

8. A processor-readable medium having processor-executable code stored thereon, which when executed by one or more processors, enables actions, comprising:
   creating a plurality of memory sets, wherein each of the plurality of memory sets is associated with a number of available credits;
   binding a first workload to a first memory set of the plurality of memory sets, wherein the first workload is formed by a first process, wherein the number of available credits associated with the first memory set identifies a first number of physical pages available to be referenced by the first process;
   binding a second workload to a second memory set of the plurality of memory sets, wherein the second workload is formed by a second process, wherein the number of available credits associated with the second workload identifies a second number of physical pages available to be referenced by the second process, wherein the first number of physical pages and the second number of physical pages are selected from a plurality of physical pages within the physical memory;
   receiving, from the first process, a first request to reference a physical page of the plurality of physical pages, wherein the physical page has a billing state of free;
   denying the first request in response to determining that the number of available credits associated with the first workload is less than a number of available credits necessary for the first process to reference the physical page;
   receiving, from the second process, a second request to reference the physical page;
   referencing, by the second process, the physical page in response to determining that the number of available credits associated with the second workload is not less than a number of available credits necessary for the second process to reference the physical page; and
   updating the number of available credits associated with the second workload to reflect the reference of the physical page by the second process.

9. The processor-readable medium of claim 8, wherein a sum of the number of available credits and a number of charged credits specified for all memory sets is equal to a total number of physical pages in the physical memory.

10. The processor-readable medium of claim 8, wherein updating a number of available credits comprises:
    reserving the available credit from the second memory set to obtain a reserved credit; and
    returning the reserved credit to the second memory set if the reserved credit is not charged to the second memory set.

11. The processor-readable medium of claim 8, further comprising:
    detecting the first process sharing the physical page; and
    ensuring that the second memory set is the only memory set charged an available credit for the physical page while the physical page is explicitly shared.

12. The processor-readable medium of claim 8, wherein updating the number of available credits comprises:
    charging a free credit to the second memory set, to obtain a charged credit, if the process is an initial process in the second workload to reference the physical page.

13. The processor-readable medium of claim 12, further comprising:
    detecting the second process releasing a last reference to the physical page; and
    refunding the charged credit to the second memory set.

14. The processor-readable medium of claim 12, further comprising:
    detecting the physical page being freed; and
    refunding the charged credit to the second memory set.

15. A device, comprising:
    a memory having a plurality of physical pages, wherein the plurality of physical pages can store code; and
    a processing component that is arranged to execute code that enables actions, including:
      creating a plurality of memory sets, wherein each of the plurality of memory sets is associated with a number of available credits;
      binding a first workload to a first memory set of the plurality of memory sets, wherein the first workload is formed by a first process, wherein the number of available credits associated with the first memory set identifies a first number of physical pages available to be referenced by the first process;
      binding a second workload to a second memory set of the plurality of memory sets, wherein the second workload is formed by a second process, wherein the number of available credits associated with the second workload identifies a second number of physical pages available to be referenced by the second process, wherein the first number of physical pages and the second number of physical pages are selected from a plurality of physical pages within the physical memory;
      receiving, from the first process, a first request to reference a physical page of the plurality of physical pages, wherein the physical page has a billing state of free;
      denying the first request in response to determining that the number of available credits associated with the first workload is less than a number of available credits necessary for the first process to reference the physical page;
      receiving, from the second process, a second request to reference the physical page;
      referencing, by the second process, the physical page in response to determining that the number of available credits associated with the second workload is not less than a number of available credits necessary for the second process to reference the physical page; and
      updating the number of available credits associated with the second workload to reflect the reference of the physical page by the second process.

16. The device of claim 15, wherein a sum of the number of available credits and a number of charged credits specified for all memory sets is equal to a total number of physical pages in the memory.

17. The device of claim 15, wherein updating the number of available credits comprises:
  reserving the available credit from the second memory set to obtain a reserved credit; and
  returning the reserved credit to the second memory set if the reserved credit is not charged to the second memory set.

18. The device of claim 15, wherein updating the number of available credits comprises:
  charging an available credit to the second memory set, to obtain a charged credit, if the process is an initial process in the second workload to reference the physical page.

19. The device of claim 18, further comprising:
  detecting the second process releasing a last reference to the physical page; and
  refunding the charged credit to the second memory set.

20. The device of claim 18, further comprising:
  detecting the physical page being freed; and
  refunding an available credit to the second memory set.

* * * * *